Figure 1:
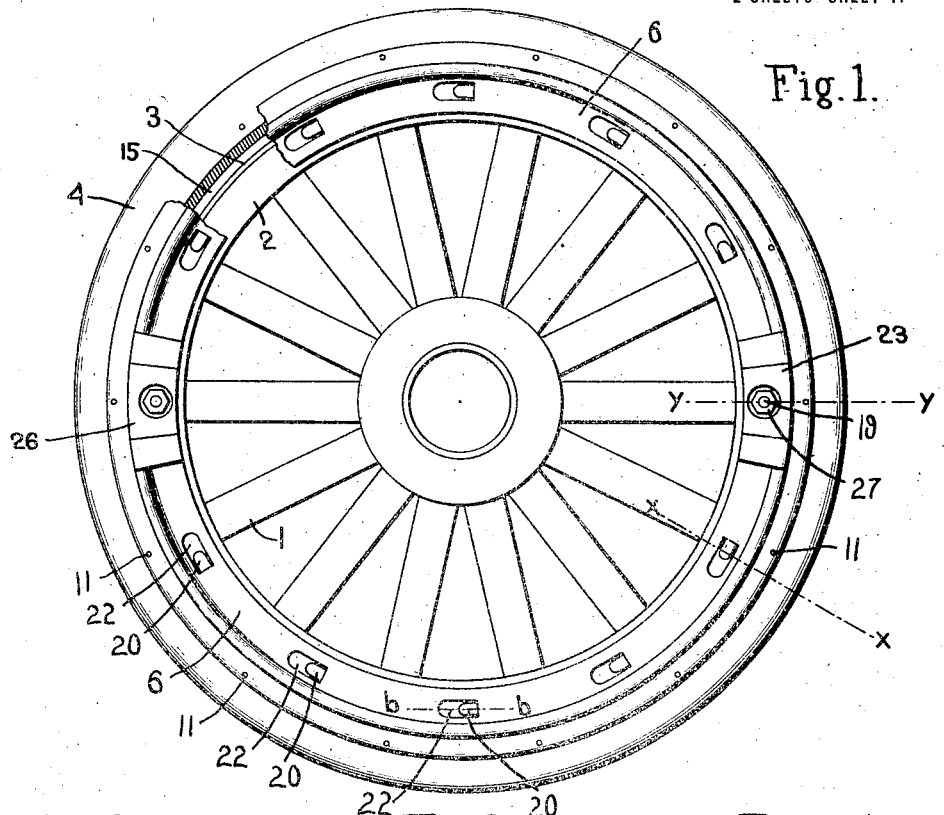

Witnesses.
J. Morrill Fuller
William E. Gagen

Inventor.
Walter E. Copithorn,
by Howard Smith & Tennant.
Atty's.

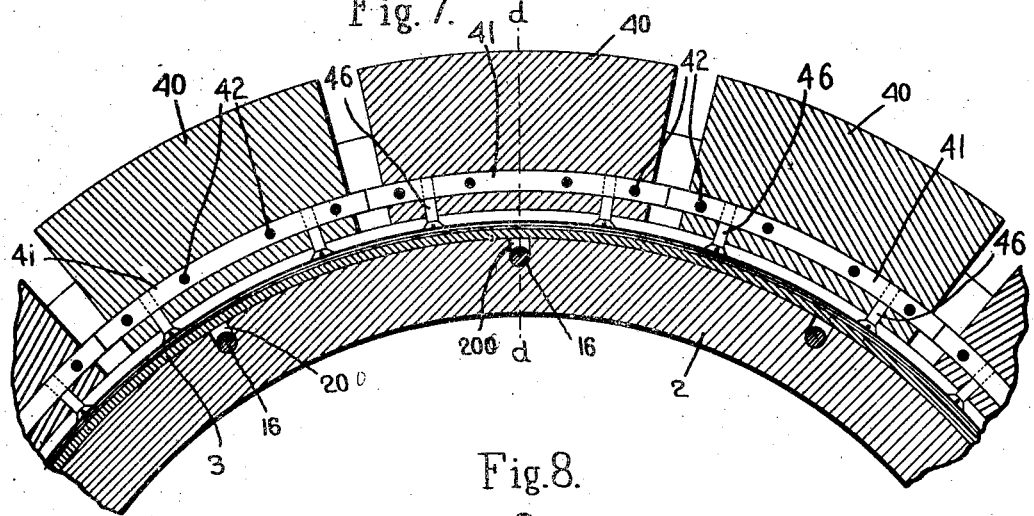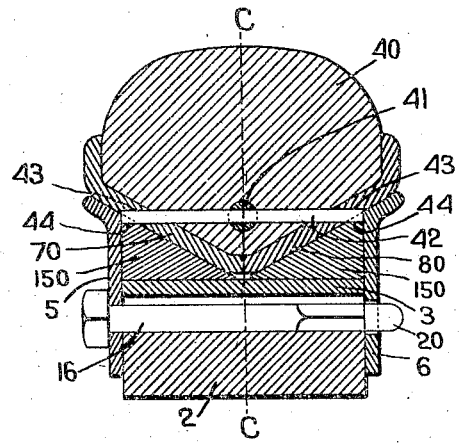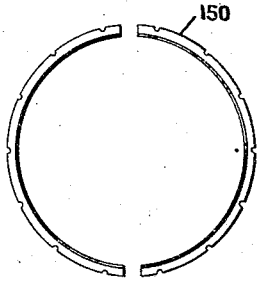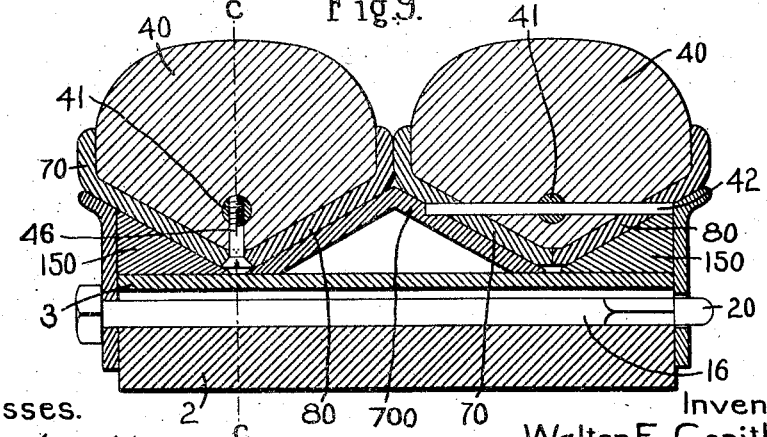

UNITED STATES PATENT OFFICE.

WALTER E. COPITHORN, OF NATICK, MASSACHUSETTS.

RIM FOR VEHICLE-WHEELS.

1,165,390.  Specification of Letters Patent.  Patented Dec. 28, 1915.

Application filed June 24, 1914. Serial No. 847,100.

*To all whom it may concern:*

Be it known that I, WALTER E. COPITHORN, a citizen of the United States, residing at Natick, county of Middlesex, State of Massachusetts, have invented an Improvement in Rims for Vehicle-Wheels, of which the following description, in connection with the accompanying drawing, is a specification, like characters on the drawing representing like parts.

This invention relates to vehicle wheels, and particularly to wheels adapted for use as truck wheels, and the invention has for its object to provide a novel demountable rim which is simple in construction and can be readily removed from or replaced on the wheel and which has other advantages that will be more fully hereinafter set forth.

In order to give an understanding of the invention I have illustrated herein a selected embodiment thereof which will now be described after which the novel features of the invention will be pointed out in the appended claims.

Figure 2:
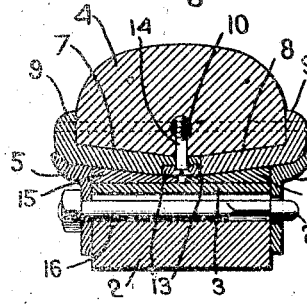
Figure 3:
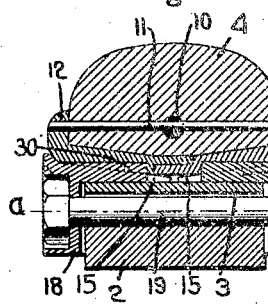
Figure 4:
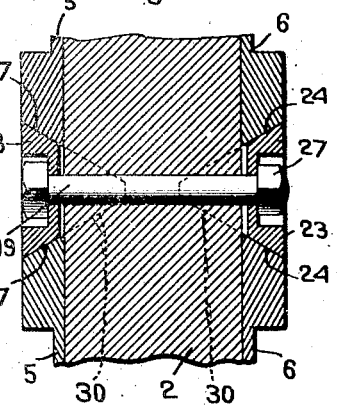
Figure 5:
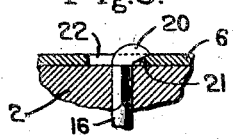
Figure 6:
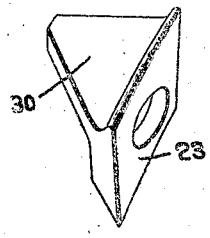

Referring to the drawings, Figure 1 is a side view of a vehicle wheel embodying my invention; Fig. 2 is a section on the line *x—x*, Fig. 1; Fig. 3 is a section on the line *y—y*, Fig. 1; Fig. 4 is a section on the line *a—a*, Fig. 3; Fig. 5 is an enlarged section on the line *b—b*, Fig. 1; Fig. 6 is a perspective view of one of the locking wedges; Fig. 7 is a sectional view on substantially the line *c—c*, Fig. 8; showing my invention as embodied in a tire with a block tread; Fig. 8 is a section on the line *d—d*, Fig. 7; Fig. 9 is a sectional view showing my invention embodied in a dual tread tire; Fig. 10 is a detail of the filling ring shown in Fig. 9.

I have shown at 1 a wheel body having any suitable or usual construction which is provided with the usual felly 2 which is encircled by the felly band 3.

4 is the tire and this may be either a continuous tread tire or a block tread tire as desired. The tire is mounted on a demountable rim which is held on the wheel between two annular members 5 and 6 situated on opposite sides of the wheel. As herein shown the demountable rim is made in two sections 7 and 8 which are separable from each other and in Figs. 2 and 3 each section of the demountable rim is provided with a side flange 9 which overlies the side of the tire. The tire 4 is made with a wire 10 extending longitudinally thereof preferably substantially in its center and with cross wires 11 which have interlocking engagement with the demountable rim and serve to prevent the tire from creeping. These wires 11 are shown as secured to the annular wire 10 preferably by extending through said annular wire, although they may be secured to the wire 10 in any suitable way. Said transverse wires 11 extend beyond the sides of the tire 4 and enter sockets or openings in the demountable rim. In the construction shown in Figs. 2 and 3 these sockets or openings are shown at 12 and are formed in the flanges 9. Further, in the construction shown in these figures the two sections 7 and 8 of the demountable rim are provided with overlapping portions 13 at their adjacent edges and they are secured together by a bolt or screw 14 which extends through these overlapping portions, and also extends up into the wire 10. These bolts 14, therefore, not only hold the sections 7 and 8 together, but form an additional means of securing the tire to the rim. The two parts 7 and 8 of the demountable rim are placed at a slight angle to each other, and situated between each part of the demountable rim and the felly band 3 is a filling ring 15 which is tapering from the outer to the inner edge. These filling rings 15 will preferably be split rings so that they can expand or contract slightly, and will thus always hug the felly band 3 tightly.

The annular members 5 and 6 are each preferably split, and the member 6 is made removable so that it can be readily taken off to provide for removing the demountable rim from the wheel. As stated above I will preferably make both members 5 and 6 in two parts, but it is not essential that the member 5 should be thus made. The annular member 5 is held in position by means of bolts 16 extending transversely through the rim, and in the illustrated embodiment of the invention these bolts occupy recesses 200 formed in the periphery of the felly 2 and are situated directly underneath the felly band 3. Where the member 5 is a two-part member I prefer the construction shown in Fig. 4 wherein each end of each part is provided with the tapering surfaces 17 which are engaged by a wedge member 18, there being two wedge members engaging the two ends of each section of the member 5, said wedge members being held firmly in place by the bolts 19. The annular member 6 is removable to permit the demountable rim to be removed, and this member is shown as provided with slots 22 which are of a size to permit the heads 20 of the bolts 16 to pass therethrough, one edge of each slot having the inclined surface 21 adapted to engage underneath the head 20.

The two sections of the member 6 are forced into locking engagement with the heads 20 of the bolts 16 by means of a wedge member 23 which acts on the inclined faces 24 at the ends of the sections 6 and which is forced home by means of the bolt 19, said bolt extending through both wedge members 18 and 23, as best seen in Fig. 4. At the opposite ends of the members 6 from those acted on by the wedge 23 I have shown another wedge member 26 which is similar in construction to the wedge member 23, although the presence of this member 26 is not absolutely necessary in securing the ring sections in place.

To remove the demountable rim the nut 27 on the bolt 19 is removed, thus permitting the wedge member 23 to be removed after which the ring sections 6 can be shifted longitudinally to permit them to be disengaged from the heads 20 of the bolts 16 and thus removed. When this is done and the wedge member 26 has also been removed, then the demountable rim can be readily taken off from the wheel.

In locking the demountable rim on the wheel the ring sections 6 are placed over the heads 20 and after the wedge member 26 has been clamped in position, then the wedge member 23 is forced home thereby acting on the inclined faces 24 of the members 6 and moving them longitudinally into locking engagement with the heads 20, as shown in Fig. 5.

In order to prevent the demountable rim from creeping, I provide the wedge members 18, 23, 26 with laterally-extending noses 30 which overlie the felly band 3 and are received in recesses formed in the underside of the demountable rim sections 7, 8.

In Figs. 7 and 8 I have shown a different embodiment of my invention which is particularly adapted for use in connection with a block tread tire. In this embodiment the tread or rubber tire 4 is made in separate sections 40 which can be independently removed from the wheel rim if required. Each tread section 4 is provided with a longitudinal wire 41 extending from one end to the other thereof and with transverse wires 42 which are secured to the longitudinal wire, preferably by extending therethrough. The ends of these transverse wires 42 extend through openings 43 formed in the two sections 70, 80 of the demountable rim and the ends of the transverse wires 43 project slightly beyond the rim sections 70, 80 and into recesses 44 formed in the filling ring sections 150. The demountable rim is held in place on the wheel between the two annular members 5 and 6 as above described, the member 6 being readily detachable to permit the tire to be removed. In this embodiment of the invention the wires 41 are anchored to the demountable rim by means of screws 46, the shanks of which extend through and occupy half recesses formed in the meeting edges of the rim sections 70 and 80. With this construction it will be seen that if any tread section 40 becomes damaged and needs to be replaced, the locking member 60 can be removed and the adjacent filling ring 150 is then taken off from the wheel, after which the rim section 80 can be readily withdrawn, this being possible because the two rim sections 70 and 80 are not connected together as in Fig. 2. After the rim section 80 is removed, then any desired tread section 40 can be removed from the wheel and replaced by a new tread section, after which the rim section 80, filling ring 150 and locking ring 6 can be replaced in position. The screws 46 together with the engagement between the ends of the wires 43 and the recesses 44 serve to hold the separate tread sections 40 firmly in their proper position.

In Fig. 9 I have illustrated my invention as embodied in a dual tread tire. The construction shown in Fig. 9 is the same as that shown in Fig. 8 except that two treads are employed and that a filling ring 700 is used between the adjacent rims.

I claim:

1. In a wheel, the combination with a wheel body, of a demountable rim encircling said body, split filling rings situated between the rim and wheel body and centering said rim, a locking ring for holding the demountable rim in position, and a locking member for the locking ring, which member has interlocking engagement with the demountable rim.

2. In a wheel, the combination with a wheel body, of a demountable rim encircling said body, positioning and locking rings secured to the wheel body and holding the rim in place, said locking ring being formed of two parts, and a wedge member engaging said two parts and locking them in position, said wedge member having means to interlock with the rim to prevent the latter from creeping.

3. In a wheel, the combination with a wheel body, of a demountable rim encircling said body, positioning and locking rings secured to the wheel body and holding the rim in place, said locking ring being formed of two parts, and a wedge member engaging said two parts and locking them in position, said wedge member having a nose entering between the wheel body and rim and interlocking with the latter to lock it from creeping.

In testimony whereof, I have signed my name to this specification, in the presence of two subscribing witnesses.

DR. WALTER E. COPITHORN.

Witnesses:
 LOUIS C. SMITH,
 THOMAS J. DRUMMOND.